United States Patent [19]
Velho et al.

[11] Patent Number: 5,855,433
[45] Date of Patent: Jan. 5, 1999

[54] METHOD OF COLOR HALFTONING USING SPACE FILLING CURVES

[76] Inventors: Luiz C. Velho; Jonas M. Gomes, both of Instituto de Matematica, Puro e Aplicada, Estradea Dona Castorina 110, 22, 460, Rio de Janeiro, Brazil

[21] Appl. No.: 798,583

[22] Filed: Feb. 10, 1997

Related U.S. Application Data

[63] Continuation-in-part of Ser. No. 335,549, Nov. 7, 1994, Pat. No. 5,602,943, and a continuation-in-part of Ser. No. 875,272, Apr. 28, 1992, abandoned.

[51] Int. Cl.$^6$ .............................. G06K 9/00; G06K 9/40; G06K 9/30; H04N 1/46
[52] U.S. Cl. ..................... 382/162; 382/266; 382/316; 358/534; 358/536; 358/298; 358/456
[58] Field of Search ..................... 358/455, 456, 358/429, 298, 536, 448, 457, 458, 459, 534; 395/102, 109; 382/266, 267, 269, 316, 162

[56] References Cited

U.S. PATENT DOCUMENTS

| | | | |
|---|---|---|---|
| 4,884,080 | 11/1989 | Hirahara et al. | 358/456 |
| 5,099,259 | 3/1992 | Hirahara et al. | 358/298 |
| 5,276,535 | 1/1994 | Levien | 358/456 |
| 5,321,525 | 6/1994 | Hains | 358/456 |
| 5,602,943 | 2/1997 | Velho et al. | 382/266 |

*Primary Examiner*—Edward L. Coles, Sr.
*Assistant Examiner*—Kimberly A. Williams
*Attorney, Agent, or Firm*—Robert M. Downey, P.A.

[57] ABSTRACT

A method of color halftoning using stochastic screening includes clustering, performing error diffusion and applying an adaptive criteria to change the cluster size according to the variation of the image color values. The method incorporates features from the traditional amplitude modulated (AM) digital halftoning methods, along with the advantages of frequency modulated (FM) techniques, recently introduced into the raster image processors of high resolution phototypesetters.

9 Claims, 10 Drawing Sheets

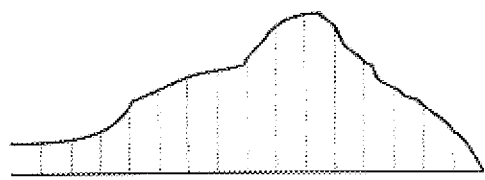
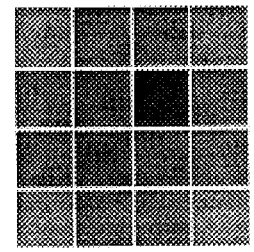
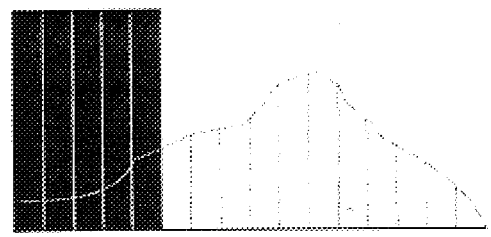
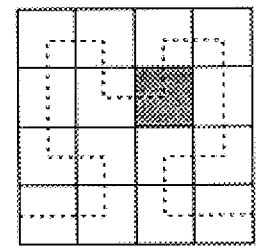
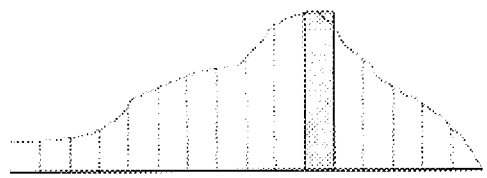
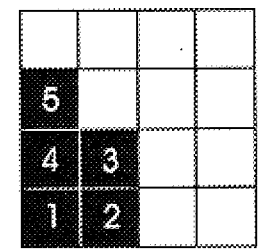
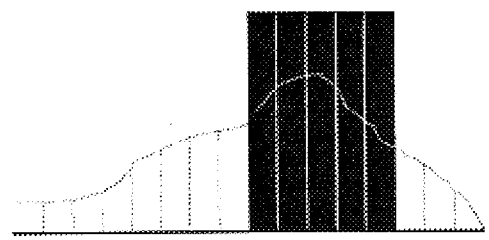
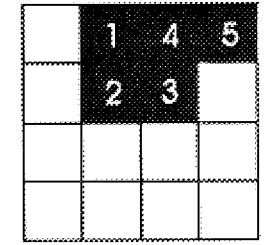
FIG. 8A                    FIG. 8B

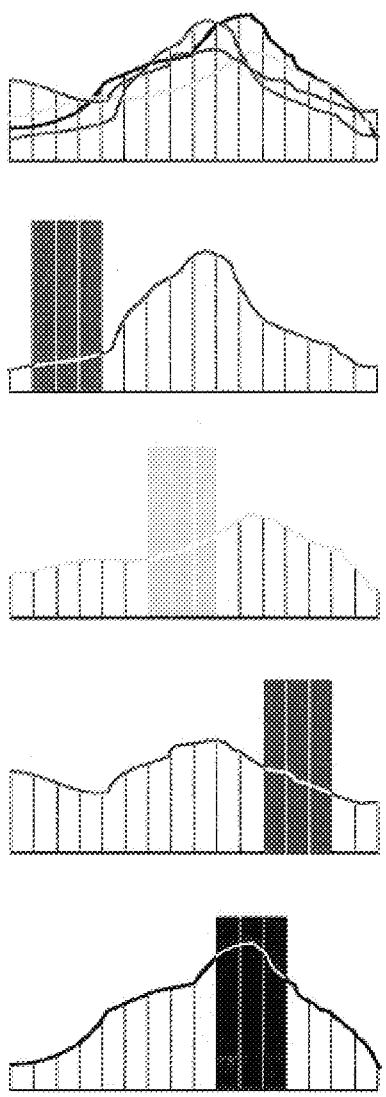
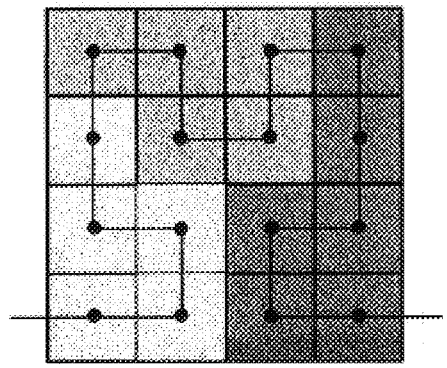
FIG. 11A
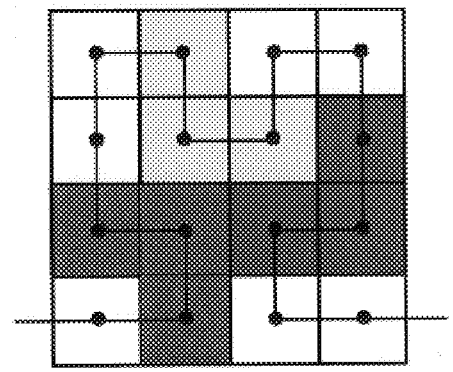
FIG. 10
FIG. 11B

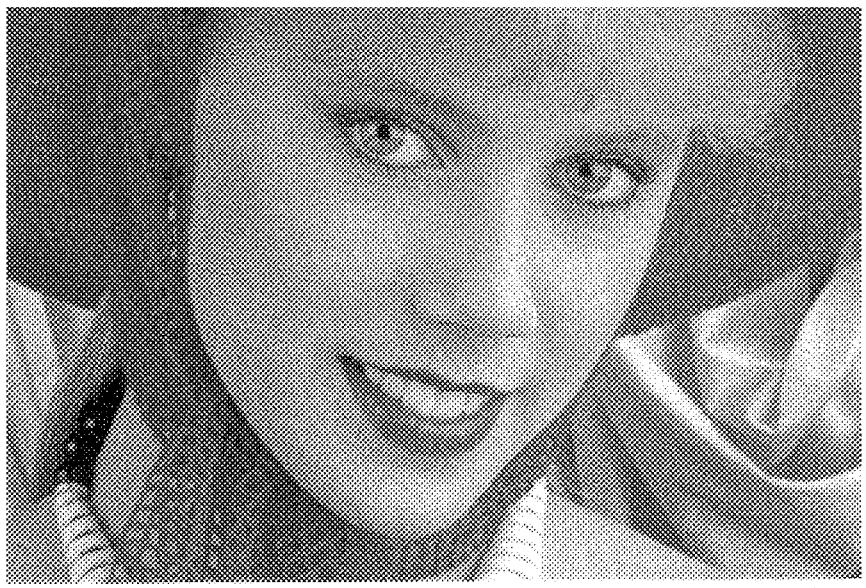
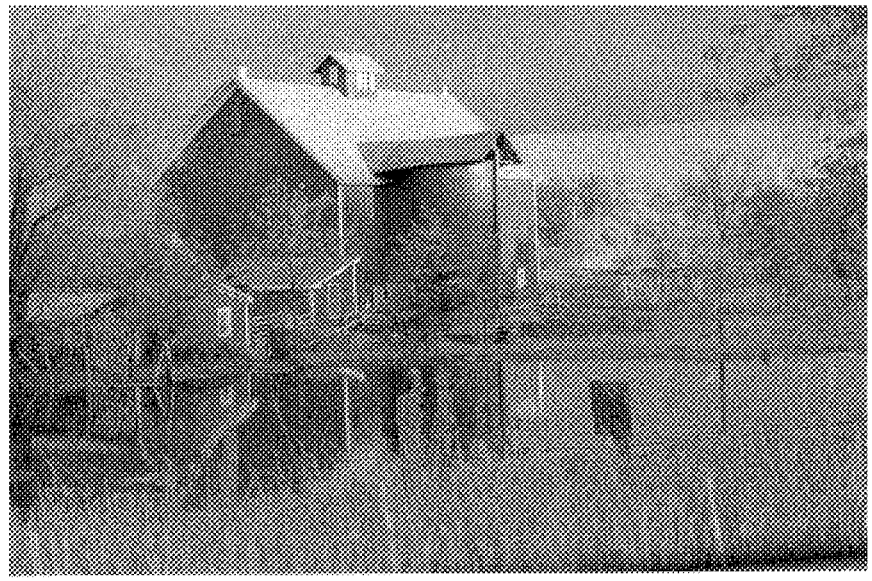
FIG. 12

Fig-13

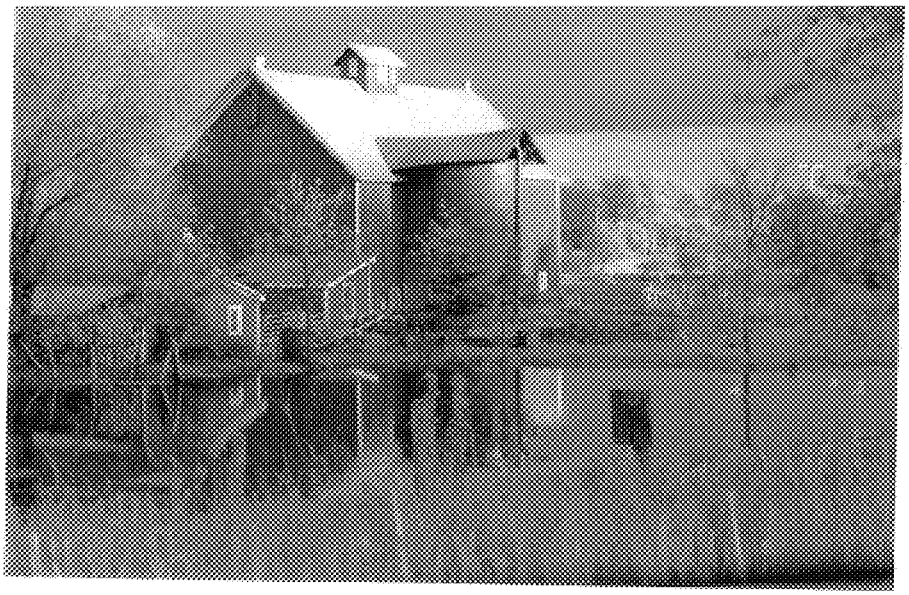
FIG. 14

METHOD OF COLOR HALFTONING USING SPACE FILLING CURVES

This application is a continuation-in-part application of patent application Ser. No. 08/335,549 now U.S. Pat. No. 5,602,943 filed on Nov. 7, 1994, which is a continuation-in-part application of patent application Ser. No. 08/875,272 filed on Apr. 28, 1992, now abandoned.

BACKGROUND OF THE INVENTION

Description of the Related Art

The reproduction of color images is a problem of great importance in business, scientific and industrial applications. A comprehensive overview of this problem can be found in Hunt, R. E. G. (1987). *The Reproduction of Color in Photography, Printing and Television*. Fountain Press, England. Different areas, and a great diversity of applications, lead to the necessity of using different media in the color reproduction process: film, paper, monitor screens, video, etc. The present invention is concerned with the reproduction of color images on paper.

There are different graphical devices that are capable of reproducing images on different types of paper. Dye sublimation printing technology produces continuous tone images on photographic quality paper. Wax transfer, inkjet and laser printers are able to reproduce color on a wide diversity of papers. In the printing industry, the offset printing process is capable of reproducing images of high quality on plain paper. The offset process surpasses the existing digital color reproduction techniques having the benefits of greater flexibility, lower cost, higher quality, and greater printing volume.

Digital techniques have been introduced into the offset printing pipeline with the objective of reducing the costs and guaranteeing a better quality control. A complete account on the problems of using digital techniques on the offset printing pipeland can be found in Stone, M. C., Cowan, W. B., and Beatty, J. C. (1988). Color gamut mapping and the printing of digital color images. *ACM Transactions on Graphics*, 7(3).

The present invention is directed to a new halftoning technique for color reproduction. The method adapts to a wide range of color reproduction processes that use halftoning in order to account for the elimination of quantization contours: inkjet printers, laser printers, wax transfer printers and the offset color printing process. We focus the applications and examples of the method of low cost color inkjet printers, and on high resolution phototypesetters.

We should point out that in spite of the advances in the area of continuous tone digital printing technology (e.g., dye sublimation printers), halftoning techniques for color printing still have a long way to evolve. This technology is essential for the color printing industry, because of the adequacy of the offset printing process to rapidly reproduce colors with great flexibility, and low cost. Also, halftoning techniques will continue to be used on a wide range of color reproduction devices (inkjet printers, laser printers, wax transfer printers, etc.).

Color Separation and Halftoning

Color printing is based on a reflective light process. The ink of the paper modulates the wavelength of the incident light, and as a result, a different color is reflected from the inked paper. This process is similar to the generation of color using a subtractive system: as we add different colors to the paper, light of different wavelength will be reflected, producing a great diversity of new colors.

Theoretically, by combining the three primary colors Cyan (C), Magenta (M), and Yellow (Y) to emulate a subtractive color system, we could be able to reproduce on paper a wide gamut of colors. Nevertheless, several considerations, of different nature, support the necessity of using Black (K), as an additional color in the printing process (see Stone, Cowan and Beatty, 1988 or Yule, J. A. C. (1967). *Principles of Color Reproduction*. John Wiley and Sons, New York.)

The process of taking a color digital image and transforming its color space to the C M Y K color space, is called color separation. Since, at least theoretically, we are able to generate the black component from the C M Y primaries, we face the problem of trading off between C M Y and K values in the color separation process. The literature about this topic is abundant. The interested reader should consult Stone, Cowan and Beatty, 1988 for a good overview, or Molla, R. K. (1988). *Electronic Color Separation*. RK Printing and Publishing Company, West Virginia, USA, for a more comprehensive discussion of the problem.

FIG. 1 shows a printed color image, and FIG. 2 shows the contents of each of its C M Y K channels. FIG. 1 is essentially obtained by overprinting each of the C M Y K channels in FIG. 2. We will return to this overprinting process later on. For the moment, we should make an important remark: in order to print each of the channels C M Y K, we must quantize it to a bitmap image. There is, thus, the necessity of using halftoning techniques (see Ulichney, R. (1987). *Digital Halftoning*. MIT Press, Cambridge, Mass.) in the quantization of each C M Y K channel, after the color separation process. Halftoning techniques avoid the perception of the severe contouring artifacts produced by the 1-bit quantization process.

A simplified diagram of the pipeline is shown in FIG. 3. A more detailed diagram of this pipeline can be found in Stone, Cowan and Beatty, 1988.

The necessity of using halftoning techniques for color reproduction on paper, resulted into a halftoning carpentry. Indeed, a lot of publications and patents have appeared about digital halftoning algorithms for color printing.

Halftoning Methods

The display of continuous-tone images in bi-level devices implies in the quatization of its intensities to one of two levels. Before the introduction of digital techniques, halftoning was produced by an analog process. In this process, the grayscale image is photographed, using a high contrast film, through a very fine and uniform screen, originating an image formed by tiny black dots, whose size varies according to the gray level intensity of the original photograph.

Digital halftoning techniques are called dithering. This is an extreme case of discretization in which continuous intensity values must be converted into a discrete set of values (in this case, only two). This operation may cause a loss of information which is estimated by the guantization error. At a particular image element, this error is the difference between the continuous and discrete values. For a region R $(i,j)$, $i=1, \ldots, m, j=1, \ldots, n$, of the image domain, we define the average intensity of the grayscale levels by $$I_m = \frac{1}{|R(i,j)|} \sum_{i,j} f(i,j), \qquad (1)$$

where $|R(i,j)|$ is the number of pixels in R. The quantization error on R is the different between the average $I_m$, and the average of the quantized pixels within the region.

Dithering techniques use a trade-off between spatial and tonal resolution. As the quantization error is spread over larger areas of the image, more tones can be represented. Gray levels are rendered in this way as patterns of black and white pixels. On the other hand, if dithering avoids contouring artifacts, it eliminates at the same time high frequency information contained in the image. The process also transforms true intensity boundaries into patterning features. In summary, intensity variation is displayed at the cost of poorer rendition of fine details. Good dithering techniques provide an optimal trade-off between tonal values and the rendition of image details.

Screening Methods for Color Halftoning

Dithering techniques can be classified according to the nature of patterns they generate, and also the type of pixel configuration they produce. These two classification criteria capture the main features of the textures created to represent low frequency areas of the image, and also, to get a better rendition of the image high frequencies.

Textures can be rendered by periodic or aperiodic patterns. In general, periodic patterns are generated by a deterministic process based on regular sampling of grids, and aperiodic patterns are modeled as stochastic processes.

The type of pixel configuration produced by dithering algorithms is determined by the spatial configuration of the "on" and "off" state of the image elements. Dispersed dot methods simulate grayscale areas by distributing the pixels, while clustered dot methods concentrate the dots in small groups.

Dot clustering techniques try to mimic the traditional analog halftoning technique used by the printing industry. The dispersed dithering method performs the halftoning in a way similar to some traditional pen-and-ink illustration techniques.

Clustered-dot dithering techniques are, in general, based on the ordered dither method, Ulichney, 1987. They distribute the black and white dot patterns (clusters) periodically, using a regular screen. There are some methods in the literature that are clustering without distributing them over a regular screen. Examples of these methods are found in Velho, L. and Gomes, J. (1991). Digital halftoning with space filling cures. *Computer Graphics (Proceedings SIG-GRAPH '91)*, 25(4):81–90 and Allebach, J. P. (1976). Random quasi-periodic halftone process. *J. Opt. Soc. A.m.*, 66:909–917.

Most of the dispersed dot dithering techniques attain the dispersion of the image elements by diffusing the quantization error along neighbor regions. This process turns out to introduce a correlated noise in the spatial distribution of the black and white pixels. In general, the noise patterns are referred to as producing a stochastic screen. Good results are obtained using a correlated noise such that its spectrum lacks low frequency power. This noise is referred to as blue noise in the literature (Ulichney, 1987). We should observe that some dispersed dot dithering techniques use a regular, periodic screen. The classical example is the dispersed ordered dithering technique introduced by Bayer, B. E. (1973). An optimum method for two-level rendition of continuous-tone pictures. In *International Conference on Communications, Conference Record*, pages (26-11)–(26-15).

The wide range of dithering techniques cover many different applications and are suited for color reproduction on a great diversity of display devices. FIG. 4 summarizes the above review. The space filling curve dithering algorithm published in Velho and Gomes, 1991 uses clusters, but it performs a diffusion of the quantization error between neighbor clusters along the space filling curve. This justifies its position on the diagram in FIG. 4.

Regular Screening

Traditional screening methods, either analog or digital, obtain a dithered image by creating regular clusters of points. The black and white dot patterns inside the clusters have a variable size, according to the image tonal values. For this reason, these techniques are known by the name of amplitude modulated dithering technique, or simply A M dithering.

When this method is used, a halftoned image of each of the separated C M Y K channels is created. During the halftoning process, the cluster grids are conveniently rotated in order to avoid full overprinting of the clusters from each of the C M Y K channels. This is illustrated in FIG. 5 where we show an amplification of a detail of the image printed in FIG. 1.

The spatial distribution of the halftoning clusters on a regular screen is prone to producing moirée artifacts in the overprinting of the C M Y K channels. Moirée patterns are illustrated in FIG. 6. On the top, we show a grayscale synthetic image that resembles the texture pattern of a cloth. In the middle, we show a 1-bit, halftoned, version of the image, using a regular screen with an angle of 6°. At the bottom, we show another halftoned version using a screen of 5°. Moirée patterns are quite noticeable, especially on the image at the bottom. Detailed discussion of moirée patterns can be found in Amidror, I. (1991). The moirée phenomenon in color separation. In *Raster Imaging and Digital Typography II, Proceedings of the 2nd Int. Conf. Raster Imaging and Digital Typography*, volume 6, pages 98–119 and Amidror, I., Hersch, R., and Ostromoukhov, V. (1994). Spectral analysis and minimization of moirée patterns in color separation. *Journal of Electronic Imaging*, 3(3):295–317.

Stochastic Screening

The first attempt to avoid the perception of quantization contours was done in Roberts, L. G. (1962). Picture coding using pseudo-random noise. *IRE Trans. Infor.* Theory, IT-8:145–154. In this paper, the use of white noise to decorrelate the quantization error was introduced. It is for this reason that dithering techniques that use regular patterns of clusters are known by the name of ordered dithering.

The idea of using noise to decorrelate the quantization error, and to avoid the perception of the quantization contours is in the right direction. The problem with white noise is that it is completely uncorrelated and, therefore, it destroys all of the image high frequencies.

Dispersed dithering algorithms use a fixed point size and modulate the spatial distribution of black and white points to render the tonal values of the image. In contrast to AM dithering techniques, these algorithms are called frequency modulated dithering, or simply FM dithering. FM dithering techniques have been introduced recently in the raster image processor of high resolution phototypesetters.

The use of correlated noise to distribute spatially the black and white dots over the image domain, is quite opposite to techniques that use a regular screen for the spatial distribution of the dot patterns. For this reason, noise correlated dithering techniques are also known by the name of stochastic screen halftoning.

Since FM dithering techniques do not use clustering, they do not perform well on printing devices which do not have a very good precision in the dot size and positioning. In this paper, we will set forth a method that encompasses the characteristics from FM and AM dithering techniques. Specifically, the method of the present invention combines the following:

it uses clustering;
it performs error diffusion;
it uses stochastic screening.

Besides the above properties, the method provides for changing the cluster size according to the rate of change of the image color intensities.

One of the main advantage of FM dithering techniques resides in the fact that it does not use regular screens. This avoids the classical problem of moirée e patterns in the color printing process with halftoning techniques.

Stochastic Screening with SFC

In this section, we briefly review the dithering with space filling curves (SFC) published by Velho and Gomes, 1991. The method takes advantage of the characteristics of space filling curves to perform neighborhood operations essential to the spatial dithering process. The path of a space filling curve approximation is used to scan the image, generating a parametrization of the image elements satisfying two properties:

- continuity: two consecutive pixels along the path of the space filling curve are in the same 4-connected neighborhood;
- non-directionality: in general, three consecutive pixels along the space filling curve path are not aligned.

We observe that the traditional scanline traversal of the image elements has an exaggerated horizontal directionality and does not have continuity. The dithering method with space filling curves consists of four steps:

- subdivide the image domain into cells;
- compute the average image intensity inside each cell;
- generate a black and white dot pattern with the cell average intensity; and
- position the dot pattern inside the cell to generate the cluster.

The subdivision of the image domain into cells is performed by following the path of the space filling curve until the number of elements visited is equal to the cell size. FIG. 7(a) shows part of the path of a Hilbert space filling curve, and a cell with 4×4 pixels. FIG. 7(b) shows 4×4 clusters with intensities varying from 15/16, on the upper left corner, to 0, on the lower right corner.

The last step of the algorithm positions the black and white dot pattern within the cell to generate the cluster. The choice we take consists in positioning the central pixel of the black pattern at the pixel inside the cell which has the highest black intensity level. This is illustrated in FIG. 8(a) for the 1-dimensional case, and in FIG. 8(b), for the 2-dimensional case. Each of these figures shows (from top to bottom):

- an image cell with 16 elements;
- a dot pattern with 5 elements that represents the average intensity within the cell;
- the cell element with the highest black intensity level (in gray);
- the translation of the dot pattern center to the position of the highest black intensity level element of the cell.

This positioning method results in a cluster that provides a much better rendition of the image details, without sacrificing the low frequency textures.

We should observe that besides the non-directionality implied by the space filling curve traversal, the method used above to construct the cluster introduces a randomness to the distribution of the clusters over the image domain. Also, it is important to mention that the quantization error in a cell is propagated to the neighbor cell, along the path of the space filling curve. This characterizes the method as a clustered-dot dithering with stochastic screening technique.

In brief, the dithering method with space filling curves uses clustering similar to the traditional amplitude modulated (AM) techniques, but at the same time, it performs error diffusion, and disperses the clusters along the path of the space filling curve. Therefore, it incorporates characteristics of FM dithering techniques.

BRIEF DESCRIPTION OF THE DRAWINGS

For a fuller understanding of the nature of the present invention, reference should be made to the following detailed description taken in connection with the accompanying drawings in which:

FIG. 8A is a diagram illustrating positioning of a black and white dot pattern within a cell to generate a cluster in a one-dimensional case;

FIG. 8B is a diagram illustrating positioning of a black and white dot pattern within a cell to generate a cluster in a two-dimensional case;

FIG. 10 shows a series of graphs to illustrate correlated positioning of the cyan, magenta, yellow and black channels of an image;

FIGS. 11A and 11B illustrate cluster positioning, according to the method of the present invention, in a two-dimensional image;

FIG. 12 shows a set of test images printed on a Kodak XLT 7720 Digital Continuous Tone Printer;

FIG. 13 shows the set of test images printed on a Hewlett-Packard Deskjet 560C Color Printer; and FIG. 14 shows color proofs of the set of test images made from a film printed on a Linotronic 300 Phototypesetter, using a resolution of 600 dpi.

DETAILED DESCRIPTION OF THE PREFERRED EMBODIMENTS

Stochastic Screening With Adaptive Clustering

Figure 1:
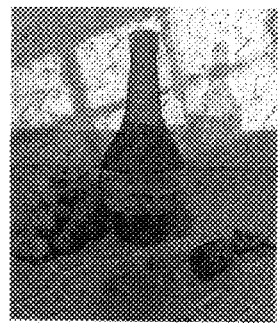
FIG. 1 is a laser printer reproduction of a color image.
Figure 2:
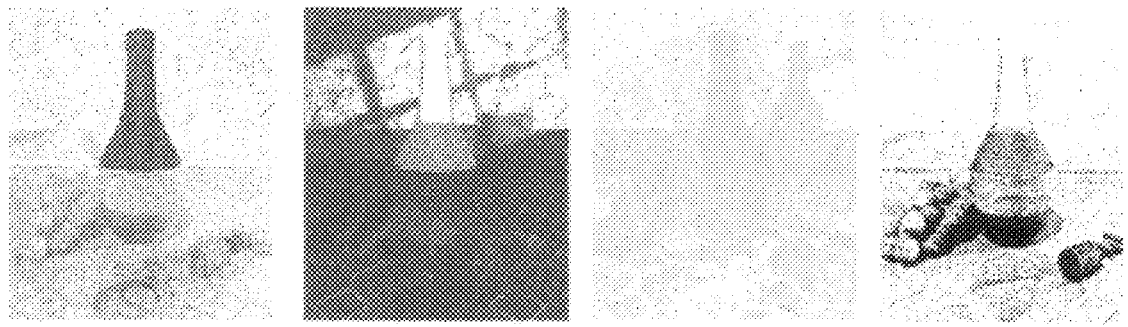
FIG. 2 shows a series of images, each for a particular color channel of the image of FIG. 1, including (from left to right) cyan, magenta, yellow and black.
Figure 3:
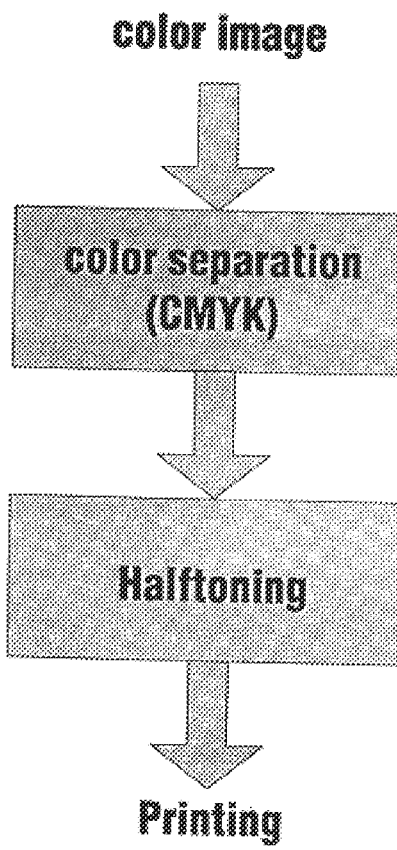
FIG. 3 is a block diagram illustrating a sequence of steps in conventional color printing techniques.
Figure 4:
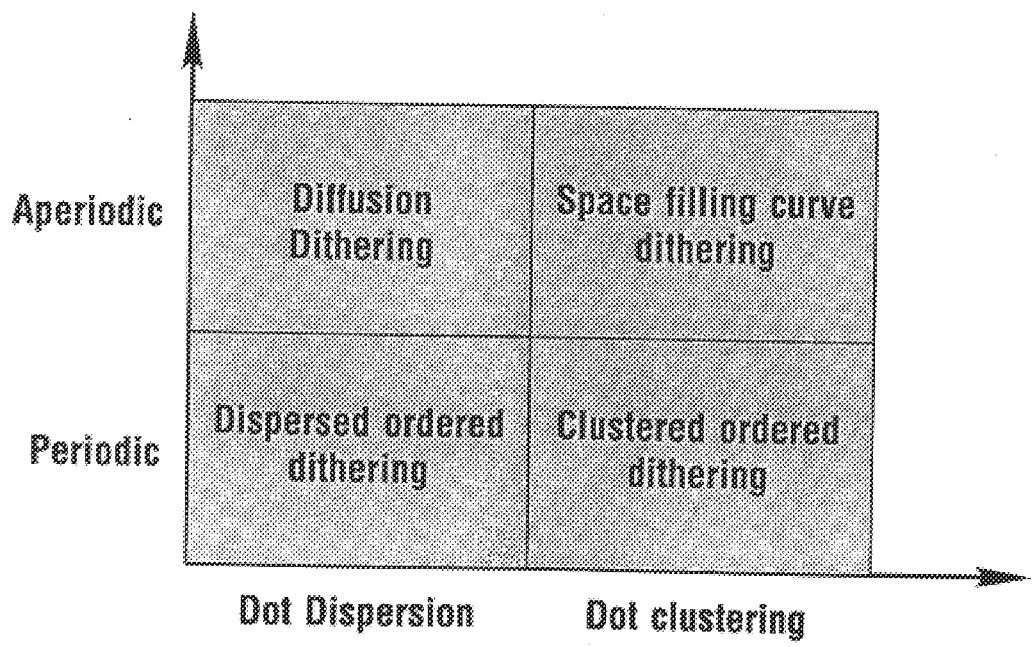
FIG. 4 is an illustrative diagram summarizing conventionally-known dithering techniques.
Figure 5:
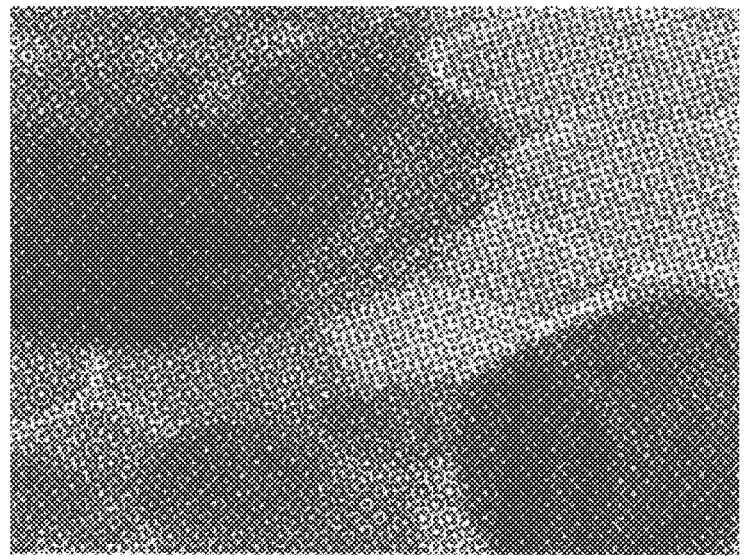
FIG. 5 is an isolated detail image taken from the laser printed reproduction image of FIG. 1, showing the detail of the printed cyan, magenta, yellow and black channels.
Figure 6:
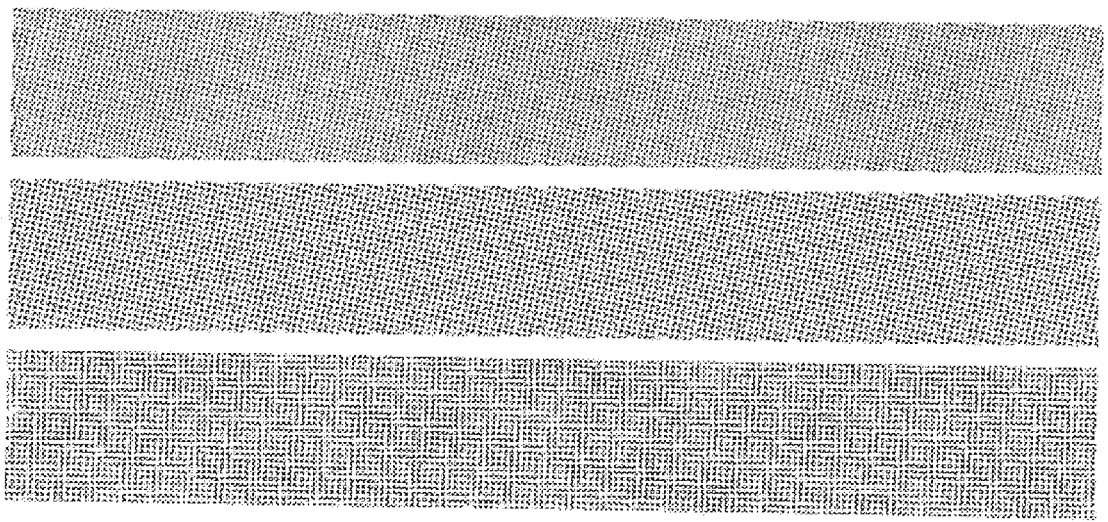
FIG. 6 illustrates three types of Moirée patterns which are encountered in spacial distribution of half-toning clusters on a conventional display screen.
Figure 7A:
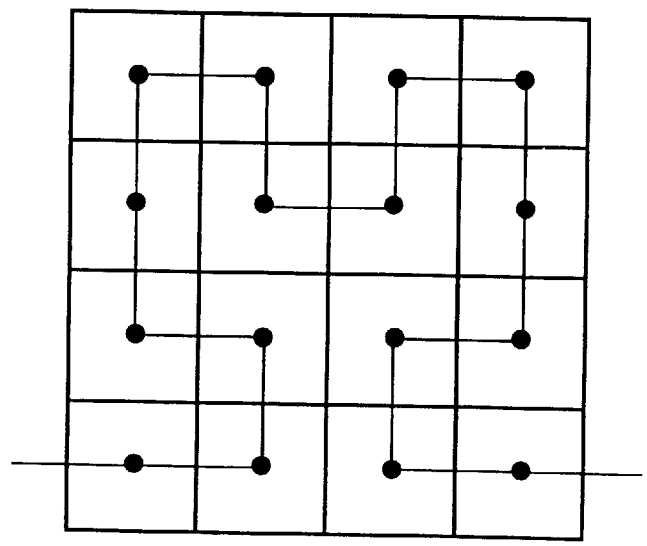
FIGS. 7A and 7B illustrate cell generation and dot patterns induced by the Hilbert space filling curve.
Figure 7B:
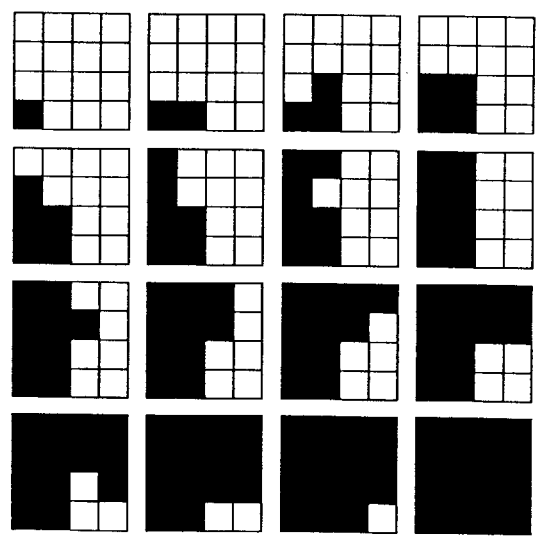

The usual expedient to minimize the loss of image detail on the halftoning process, consists in performing an image enhancement, either as a preprocessing step, or incorporated in the dithering algorithm prior to quantization. Although this alleviates the problem, it is an adhoc solution and the results are far from being optimal.

Much better results can be obtained by a careful application of dithering where it is needed. In image areas where the intensity changes slowly there is only shading information. In image areas with abrupt changes of intensity there is also shape information that is often manifested in the form of edges. Therefore, when dithering is applied to image areas of low contrast, it generates patterns of dots conveying the impression of gray tones with no loss of information. But, when it is applied to image areas of high contrast, the dither eliminates edges destroying spatial information.

In order to preserve spatial detail, it is necessary to constrain the contours created by transitions between black and white areas to align as much as possible with the real edges of the original image. This must be done without changing the overall image contrast.

In the case of dispersed-dot dither, these goals can be achieved by various methods that try to use some type of correlated noise. In the case of clustered-dot dither, the best method to obtain a faithful reproduction of image details it to use an adaptive method to change the cluster size according to the variation of the image intensity values. In fact, with a fixed cluster size, it will not be possible to capture features smaller than the size of the halftone screen dots. The best strategy is to make the size of clusters vary according to rate of change in intensity over regions of the image.

The method of the present invention extends our earlier space filling curve dithering method in order to obtain an adaptive control over the cluster size. This control will enable us to incorporate a variable cluster size that, along with the above-mentioned properties, creates a dithering texture similar with the granularity found in photography.

Our space filling curve method subdivides the image domain into cells, and at each cell it approximates the image function f(x, y) by some bi-level image function f(x, y). The approximation criteria is a perceptual one, based on pixel intensities. The adaptive clustering dithering consists of changing the size of each cell, and therefore of its associated cluster, based on some adaptive criteria, in order to get a better binary approximation f of the image function f.

The adaptive criteria to compute the cluster size depends on the desired effect to be obtained by the halftoning method. According to the present invention, the goal is to achieve the best rendition of image detail without compromising tonal reproduction. Therefore, we should use an adaptive criteria that varies the cluster size according to the rate of change of the image intensity. In order to accomplish this, we need to measure the variation of image intensities as we scan the image. Since we are using the C M Y K color space, the image function is a map $f:U \subset R^2 \rightarrow R^4$, therefore, the rate of change of the image color values along the space filling curve can be measured by the derivative $f':R^2 \rightarrow R^4$. If we denote the coordinates of the image function by $f=(f_C, f_M, f_Y, f_K)$, the derivative f' is represented by the jacobian matrix $$f' = \begin{pmatrix} \frac{\partial f_C}{\partial x} & \frac{\partial f_C}{\partial y} \\ \frac{\partial f_M}{\partial x} & \frac{\partial f_M}{\partial y} \\ \frac{\partial f_Y}{\partial x} & \frac{\partial f_Y}{\partial y} \\ \frac{\partial f_K}{\partial x} & \frac{\partial f_K}{\partial y} \end{pmatrix} \quad (2)$$

Since we are scanning the image along the path of the space filling curve, the norm of the directional derivative along the curve furnishes a good measure for the rate of change of the image intensities along the scanning direction. The directional derivative is computed by applying the jacobian matrix from equation (2), to the unit vector $u=(u_1, u_2)$ along the scanning direction defined by the space filling curve. That is, $$\frac{\partial f}{\partial u} = f' \cdot u = \begin{pmatrix} \frac{\partial f_C}{\partial x} & \frac{\partial f_C}{\partial y} \\ \frac{\partial f_M}{\partial x} & \frac{\partial f_M}{\partial y} \\ \frac{\partial f_Y}{\partial x} & \frac{\partial f_Y}{\partial y} \\ \frac{\partial f_K}{\partial x} & \frac{\partial f_K}{\partial y} \end{pmatrix} \cdot \begin{pmatrix} u_1 \\ u_2 \end{pmatrix}. \quad (3)$$

We should point out that for a grayscale image, that is $f:U \subset R^2 \rightarrow R$, equation (3) reduces to the well know inner product formula between the gradient of the image function f, and the unit vector u $$\frac{\partial f}{\partial u} = f' \cdot u = <\text{grad } f, u>. \quad (4)$$

After deciding that the directional derivative sill take care of the adaptiveness criteria, it remains to obtain the correct relationship between the cluster size and the directional derivative vector. As the norm of the derivative vector gets bigger, image intensities change faster and, therefore, the cluster size should get smaller.

We first observe that the intensities distribution in a dithered image must follow a perceptual criteria. Also, the eye response to intensity changes obeys a logarithmic law see Rosenfeld and Kak, 1976 Based on these two remarks, we conclude that we should vary the cluster size exponentially with the gradient magnitude. This rule maintains a linear relationship between the perceptual intensity inside each cluster and the directional variation of the image intensity.

Figure 9A:
FIG. 9A illustrates an image with a constant cluster size of 11 pixels.
Figure 9B:
FIG. 9B is a variation of the image of FIG. 9A wherein the cluster size is varied up to a maximum size of 11 pixels.

FIG. 9 shows an example of a dithering with space filling curve of the same image, using a fixed cluster size of 11 pixels (a), and using the derivative adaptiveness criteria to change the cluster size (b), allowing a maximum value of 11 pixels for the cluster size. From these images, it is noticeable how the adaptive clustering algorithm provides a better rendition of image details, without compromising the tonal values on the low frequency regions of the image.

We should remark that there are different variations when using the above method to obtain an adaptive change of the cluster size for color image halftoning, as described more fully hereinafter.

Color Halftoning with SFC

In this section, we will describe the different possibilities of the use of stochastic screening with space filling curve, for color printing. According to the techniques we discussed in the previous sections, we have two methods of choice:

color printing with fixed cluster size;
color printing with an adaptive cluster size.

In the first case, the cluster size is fixed for each of the image channels, C, M, Y and K. In the second method, we use an adaptive procedure to change the cluster size for each of the four channels.

By combining the two methods above, we are able to devise different algorithms for color printing using space filling curves. These algorithms take into account the two possibilities above, with the fact that it is possible to vary the dot pattern position to generate the cluster for each of the channels, C, M, Y and K. We will describe these methods below.

Color Halftoning with Fixed Cluster Size

By fixing the cluster size, we have two possibilities for the cluster position:

independent cluster position;
correlated cluster position

In the first method, there is no relationship between the position of the cluster for each of the C M Y K channels. In the second method, the position of the cluster for each of the C M Y Channels are influenced by each other.

Independent Cluster Position

This method subdivides into two different options. The first option consists in positioning the cluster randomly inside each cell, for each of the C M Y K channels. We have discarded experiments with this method because it gives not control over color cluster overlapping in the printing process. This would certainly give poor final results.

The other possibility arising from independent cluster positioning, consists in centering the cluster size in each of the channels C M Y K on the pixel of highest intensity of the channel within the cell.

Correlated Cluster Position

The strategy of this method consists in devising a correlation of the cluster position in order to minimize color overlapping in the printing process. From Section 4, we know that the clusters of the black channel should be centered at the pixel of highest black intensity within the cell in order to obtain a better rendition of image details.

Therefore, a good strategy consists in positioning the black cluster to obtain a better definition of image details, and position the C, M, and Y clusters in such a way to minimize color overprinting between these channels. More precisely, the positioning strategy is done in the following way (see FIG. 10):

center the cluster of the black channel at the pixel of highest black intensity within the cell;

subdivide the cell into three subcells, and position the center of the cluster of each of the C, M. and Y channels at the center of each of the three subcells.

We illustrate the above cluster positioning method for the two-dimensional case in FIG. 11: FIG. 11(a) shows the cell subdivision into three subcells, and in FIG. 11(b) shows the position of the C, M and Y clusters center within each subcell. Notice that the order of the cyan, magenta and yellow clusters along the path of the space filling curve is C<Y<M. This order turns out to give better results. Changing it, will result in a subtle color shift on the printed image.

As we remarked before, the positioning of the C M Y clusters is done in such a way to minimize color overlapping in the printing process. In FIG. 11, there will be an overlapping of C M Y clusters only if the cluster size is greater than 5 pixels.

Color Halftoning with Adaptive Cluster Size

Previously, we described how to use the direction derivative of the image function to obtain an adaptive variation of the cluster size. Using this method, we can devise three different procedures for color halftoning with the adaptive space filling curve method:

independent cluster;

constrained cluster;

correlated cluster.

Independent Cluster

In this method, the adaptiveness of the cluster size is performed independently for each of the four channels C M Y K. The cluster is positioned in the pixel of highest intensity inside the cell.

Constrained Cluster

In this method, we compute the adaptive size of the cluster for the black channel, replicate this size to each of the C M Y channels, and position the clusters in the pixels of maximum intensity within the cell.

Correlated Cluster

In this method, we use a constrained cluster size, as described above, and we position the C M Y K clusters according to the correlation method explained above and illustrated in FIG. 10 and 11.

Experiments and Results

The results of applying the halftoning method with space filling curve, using different print devices are set forth below. All of the images were halftoned using the adaptive correlated cluster size method.

We should remark that we did not dedicate too much time for dealing with the adequate color correction for each device. Our main interest in these experiments was choosing the best cluster size variation for each device.

FIG. 12 shows the original test images. These images were printed on a Kodak XLT 7720 digital continuous tone printer, from RGB 24 bits image files. Dye sublimation technology produces grayscale images, and we printed them for comparison with the printed images on different devices, using our halftoning technique.

FIG. 13 shows the result of printing the two test images on a Hewlett-Packard deskjet 560C color printer. This printer uses the inkjet technology, and can print either on plain paper, or on a special paper. The images here were printed using the special HP glossy paper. The printing resolution if 300 dpi, and the maximum cluster size if 3. The decision of using this size was influenced by the good quality of the printer using dispersed error dithering techniques.

The color separation process was done by the inventors hereof based on some information about the color behavior of the printer, provided by Hewlett-Packard.

The images on FIG. 14 are color proofs of the two test images. These color proofs were made from a film printed on a linotronic 300 phototypesetter, using a resolution of 600 dpi. For these images, we used a value of 7 pixels for the maximum cluster size. The color separation for the production of these images was done using Photoshop™ from Adobe. The color proof was done on a color printing service bureau.

Conclusions

The invention, as set forth above, is directed to a halftoning method for color reproduction that incorporates characteristics from both AM and FM halftoning techniques. The method of the present invention uses dot-clustering, stochastic screening, performs error diffusion and is able to change the cluster size according to image color variation.

These features result in a very flexible color halftoning technique, which is able to adapt to a wide range of printing devices. This is shown by some of the experiments with the method, as set forth above.

Since the method of the present invention uses stochastic screening, it avoids the occurrence of moirée patterns, when we overprint each of the halftoned color channels. Therefore, it is a natural halftoning technique for printing with any number of process colors.

While the instant invention has been shown and described in what is considered to be preferred and practical embodiments thereof, it is recognized that departures may be made within the spirit and scope of the present invention which, therefore, should not be limited except as set forth in the following claims as interpreted under the doctrine of equivalents.

Now that the invention has been described,

What is claimed is:

1. A halftoning method for reproducing a color image in electronic display and printing systems, the color image being composed of the primary color components cyan, magenta, yellow and black, said method comprising the steps of:

subdividing the color image into regions based on a trace of a space filling curve, further subdividing each of said regions into equally sized pixels, the region defining a pixel cluster, each of said regions including at least one pixel, scanning said color image along the trace of said space filling curve to visit all pixels of said color image in a sequential order, determining a norm of a directional derivative along the space filling curve, calculating an average image intensity for each region of the color image, measuring a variation of image intensity along the space filling curve to determine a rate of change of image intensity, establishing a range of pixel cluster intensity levels based on a number of said pixels in said cluster, a particular intensity level of said pixel cluster being defined by the ratio of the number of pixels in said cluster being in an ON state and the total number of pixels in said cluster, the spatial configuration of said ON state pixels producing a dot pattern having an intensity level corresponding to the average image intensity for that region, varying the cluster size inversely relative to the rate of change of image intensity, and generating said dot pattern for each of said pixel clusters by activating individual ones of said pixels to said ON state in an order corresponding with said sequential order along the trace of said space filling curve through each of said pixels of said region with the option of distributing said ON pixels around a point of highest intensity of the color image in the region.

2. A halftoning method as recited in claim 1 wherein said subdivision of the color image into regions and said further subdivision of each of said regions into pixels is determined by the trace of said space filling curve over the color image.

3. A halftoning method as recited in claim 1 wherein each of said pixel clusters are comprised of a block of contiguous image elements along the trace of said space filling curve, said pixel clusters having a fixed size for a given source image with the pixel cluster size starting from one pixel in said region and increasing by increments of one pixel.

4. A halftoning method as recited in claim 1 wherein the size of said pixel clusters varies in accordance with a given color image so as to adapt to particular properties of the color image, including, but not limited to, the directional derivative of the intensity value along said space filling curve and relative contrast of color component values.

5. A halftoning method as recited in claim 1 wherein the size of said pixel clusters is derived from characteristics of the display system, including, but not limited to, display resolution, tone reproduction and color space.

6. A halftoning method as recited in claim 1 wherein said step of calculating an average intensity for each region further includes the steps of:

accumulating intensity values of all pixels in said pixel cluster, calculating a quantized value and corresponding quantization error for said region, and distributing the quantization error among subsequent pixel clusters along the trace of the space filling curve.

7. A halftoning method as recited in claim 1 wherein a rendition of the color image in electronic display systems is created by separately executing the steps of the method as recited in claim 1 for each of said color components of the color image.

8. A halftoning method as recited in claim 7 wherein relative positions of said dot patterns for each color component are offset within each pixel cluster proportionally to the number of color components and the size of the region.

9. A halftoning method as recited in claim 1 further including the steps of:

applying a digital filter to the color image to change the average image intensity of one or more of said regions.

* * * * *